US 6,722,592 B2

(12) United States Patent
Harris

(10) Patent No.: US 6,722,592 B2
(45) Date of Patent: Apr. 20, 2004

(54) APPARATUS FOR REMOVING FRANGIBLE OBJECTS FROM A CONTAINER

(76) Inventor: Jack Harris, 6638 Pecue La., Baton Rouge, LA (US) 70817

( * ) Notice: Subject to any disclaimer, the term of this patent is extended or adjusted under 35 U.S.C. 154(b) by 0 days.

(21) Appl. No.: 10/152,764

(22) Filed: May 21, 2002

(65) Prior Publication Data

US 2003/0218085 A1 Nov. 27, 2003

(51) Int. Cl.⁷ ............................................... B02C 19/12
(52) U.S. Cl. .................... 241/27; 241/186.2; 241/189.1
(58) Field of Search .......................... 241/189.1, 186.2, 241/30, 27

(56) References Cited

U.S. PATENT DOCUMENTS 3,856,218 A * 12/1974 Harmon et al. .......... 241/185.5
4,568,029 A    2/1986 Newton et al.
5,388,773 A * 2/1995 Perry ........................ 241/19

FOREIGN PATENT DOCUMENTS

| DE | 19650188 | 10/1998 |
| JP | 62014938 | 1/1987 |
| JP | 62023433 | 1/1987 |
| JP | 04045840 | 2/1992 |

* cited by examiner

*Primary Examiner*—Mark Rosenbaum
(74) *Attorney, Agent, or Firm*—Keaty Professional Law Corporation

(57) ABSTRACT

Frangible objects that become packed in large containers are removed by crushing the objects while they are still in the containers. A motor-driven crushing assembly is lowered into the container, where rotating strikers come into contact with the frangible objects and break the objects into smaller fragments. The broken fragments are guided into a guiding chute, from which they may be removed by conventional industrial vacuum equipment. The invention may be used for unloading ceramic packing from acid towers.

10 Claims, 1 Drawing Sheet

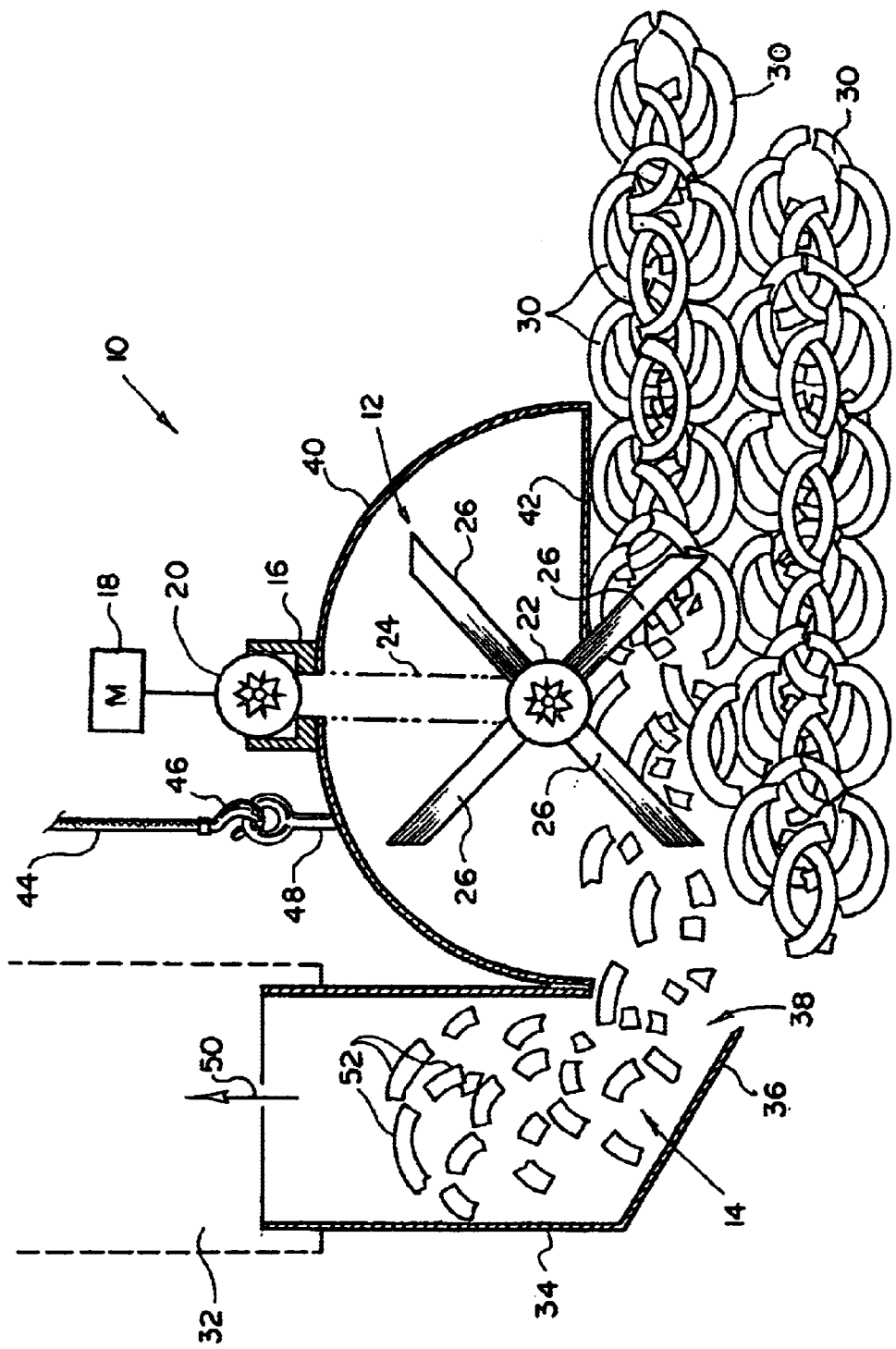
F I G. 1

APPARATUS FOR REMOVING FRANGIBLE OBJECTS FROM A CONTAINER

BACKGROUND OF THE INVENTION

This invention relates to an apparatus for removing frangible objects from a container, and more particularly, to an apparatus for unloading ceramic packing from an acid tower or similar container.

During production of acids, various solid packing materials are used in the acid tower. The processing vessel, or the acid tower, needs to be emptied and cleaned from time to time. At that time the packing material, which is conventionally called "ceramic packing" needs to be removed from the vessel. Conventional ceramic packing is made of frangible ceramic material; they are formed in various shapes and sizes.

Conventionally, the ceramic packing is removed from the acid towers by mining or vacuum. The vacuum tubes or hoses used are typically 6 inches in diameter. Due to the size and shape ceramic packing becomes locked together and removal of the ceramic packing presents a substantial difficulty. A typical acid-processing tank is about 60 feet high and 9–25 feet in diameter. The packing may be deposited on a support grid of the tank and occupy up to 15 feet of the height of the tank. In effect, the interlocking saddles form a packing column in the processing tank.

With conventional equipment, even if two vacuum machines are used in tandem, the cleanup and removal operation is extremely slow, allowing to move about 200–300 cubic feet an hour. When the typical area to be cleaned is about 7000 cubic feet, one can expect to spend about 30 hours cleaning up the acid tower and unloading the ceramic packing. During vacuuming, the ceramic pieces, being frangible, often break. However, the breakage is of no concern since the packing is disposed of after it has been removed from the acid-processing vessel, or tank.

The present invention contemplates elimination of drawbacks associated with the prior art and provision of an apparatus for unloading the ceramic packing or similar frangible objects from a container.

SUMMARY OF THE INVENTION

It is, therefore, an object of the present invention to provide an apparatus for removing frangible objects from a container with the objects being designated for disposal.

It is another object of the present invention to provide an apparatus for unloading ceramic packing from an acid-processing tank.

It is a further object of the present invention to provide an apparatus for unloading ceramic packing that is easy to operate and inexpensive to manufacture and that can be used in cooperation with conventional vacuuming equipment.

It is still a further object of the present invention to provide a method of unloading frangible objects from a container.

These and other objects of the present invention are achieved through a provision of an apparatus for unloading frangible members from a container, such as for instance a processing tank of an acid tower. The unloading apparatus comprises a crushing assembly provided with a plurality of rotatable strikers that come into contact with the frangible members and break the frangible members into smaller fragments. The unloading assembly is driven by a motor, for instance a hydraulic motor, which imparts the torque to the crushing strikers. The motor-driven drive unit of the crushing assembly has sufficient power to cause fracture of the frangible members.

The crushing assembly is provided with a guiding chute secured adjacent to the crushing stikers. An opening formed in the lower portion of the guiding chute receives the broken fragments, which are pushed by the crushing strikers toward the guiding opening. The upper portion of the guiding chute is configured to be connected to a vacuum source, such as a hose of a vacuum apparatus. The crushed fragments are sucked from the guiding chute and delivered outside of the container, or tank by the vacuum apparatus.

BRIEF DESCRIPTION OF THE DRAWINGS

Reference will now be made to the drawings, wherein like parts are designated by like numerals, and wherein FIG. 1 is a schematic view of the unloading apparatus in accordance with the present invention.

DETAILED DESCRIPTION OF THE PREFERRED EMBODIMENT

Turning now to the drawing in more detail, the apparatus of the present invention for unloading frangible objects is designated by numeral 10. The apparatus 10 comprises a crush assembly 12 and a guide chute 14. The crush assembly 12 comprises a drive unit 16 operationally connected to an external power source, for instance a hydraulic motor 18.

The drive unit 16 drives a pair of gear wheels 20, 22 connected with a chain 24, which transmits a rotating force from the unit 16 to the gear wheels 20 and then to the gear wheel 22. A plurality of crushing strikers 26 are operationally connected to the driven gear wheel 22. The strikers 26 rotate when the drive unit is in operation. The strikers 26 come into contact with the frangible objects inside the container and crush or break the frangible objects.

In FIG. 1, the frangible objects are schematically illustrated as interlocking saddles 30, which form a packing column. The ceramic packing members, or interlocking 30 become crushed into smaller pieces, with any ceramic packing members being reduced to fragments of 3 to 4 inches in size. As the strikers 26 rotate, they tend to also move the broken fragments in the direction of the guiding chute 14.

The guiding chute 14 is connected to a conventional vacuum hose 32, which, in turn, is connected to a vacuum equipment (not shown) outside of the processing tank. The guiding chute 14 has a vertical wall 34 that is configured for engagement with a vacuum hose 32 and an inclined bottom wall 36. The inclined wall 36 narrows the input opening 38 of the guiding chute 14, so as to facilitate concentration of the broken fragments into a predetermined flow suitable for moving by the vacuum force of a conventional equipment designed for such purposes.

To prevent the fragments from escaping upwardly and causing injury to the operating 110 personnel or damaging the drive unit 16, the apparatus of the present invention provides for the use of a housing 40. As can be seen in FIG. 1, the drive unit 16 is secured outside of the crushing assembly housing 40.

The first gear wheel 20 is mounted outside of the housing 40, where the unit 16 is connected to the power source 18. The second gear wheel 22 is mounted inside the housing 40 adjacent to a bottom support plate 42. The support plate 42 extends inwardly in relation to the arcuate housing 40 so as to support the gear wheel 22, while allowing the strikers 26 to extend outside of the housing 40 when crushing the frangible members 30 below the crushing assembly 12.

In operation, the crushing assembly 12 is lowered into the processing tank by a chain 44 which carries a hook-like member 46 on the lower end thereof. The hook 46 engages a suspension member 48 attached to the crushing assembly 12. The crushing assembly 12 is fixedly attached to the guiding chute 14. As a result, when the crushing assembly 12 is lowered into the processing tank, above the packing column, the unloading apparatus is oriented in contact with the frangible members 30.

The packing members, such as the interlocking saddles 30 are gradually crushed with the strikers 26, as the apparatus 10 is moved inside the processing tank. If desired, the chain 44 may be substituted by a handle allowing to more easily maneuver the unloading apparatus 10 inside the processing tank or a wheel driven robot. The drive unit 16 can operate a conventional gear drive to impart torque to the strikers 26 and cause them to move inside the packing column while breaking the frangible members. As the fragments are guided into the opening 38 and into the chute 14, they are pulled in the direction of arrow 50 upwardly into the vacuum hose 32, from where the broken fragments 52 are collected and disposed of in the usual manner.

The power source 18 can be any available power source, be it a hydraulic motor, an electrical motor, or other similar means for imparting rotation to the strikers 26. It is envisioned that the unloading apparatus of the present invention can be used for removing other frangible objects from large containers, where the frangible objects become packed, interlocked, or otherwise difficult to remove. By crushing the solid objects inside the container, before the objects are vacuumed, the operator can substantially increase the speed of unloading or cleaning operation and eliminate the need for manual destruction of the packed material.

Many changes and modifications can be made in the design of the present invention without departing from the spirit thereof. I therefore pray that my rights to the present invention be limited only by the scope of the appended claims.

I claim:

1. An apparatus for unloading frangible packing members from an acid processing tank, comprising:

a crushing assembly adapted for positioning inside the tank, said crushing assembly comprising a motor-driven means for breaking the packing members into fragments; and a guiding chute mounted in secure attachment with said crushing assembly for guiding the fragments toward a removal conduit, said crushing assembly comprising a plurality of rotatable strikers for imparting a breaking force on said packing members during rotation of said strikers.

2. The apparatus of claim 1, wherein said crushing assembly further comprises a drive unit and a gear assembly operationally connected to said drive unit, and wherein said strikers are operationally connected to said gear assembly.

3. The apparatus of claim 1, further comprising a crushing assembly housing, said housing enclosing said strikers and preventing the fragments from moving upwardly toward a drive unit.

4. The apparatus of claim 3, wherein said housing is fixedly attached to said guiding chute, and wherein a guiding opening is defined by a lower portion of said guiding chute, said guiding opening being located adjacent to said strikers.

5. The apparatus of claim 4, wherein said strikers are sized to facilitate movement of the fragments into said guiding opening.

6. The apparatus of claim 3, wherein said housing is provided with a means for suspending the crushing assembly inside said tank.

7. A method of unloading ceramic packing from a processing tank, the method comprising the following steps:

providing a crushing assembly comprising a plurality of rotatable crushing strikers and a guiding chute;

lowering the crushing assembly into the processing tank and positioning said crushing strikers in contact with said ceramic packing;

providing a motor-driven unit for moving said crushing strikers;

causing rotation of said crushing strikers and imparting a crushing force on said ceramic packing, thereby breaking said ceramic packing into fragments; and guiding said fragments into the guiding chute for removal from said processing tank.

8. The method of claim 7, wherein said step of providing a motor-driven unit comprises a step of providing a pair of driving gear wheels, and further comprising a step of connecting said crushing strikers to one of said gear wheels.

9. The method of claim 7, further comprising a step of providing said crushing assembly with a housing mounted above said crushing strikers to prevent an upward escape of the fragments.

10. The method of claim 7, further comprising a step of providing said guiding chute with an upper portion, said upper portion being sized and shaped for connection to a vacuum source.

* * * * *